(12) United States Patent
Lopez

(10) Patent No.: US 7,331,871 B2
(45) Date of Patent: Feb. 19, 2008

(54) TACTILE SIGNAL-PRODUCING VEST WORN WHILE PLAYING A VIDEO GAME

(76) Inventor: Miguel Lopez, 4615 S. Komensky, Apt. 2, Chicago, IL (US) 60632

( * ) Notice: Subject to any disclaimer, the term of this patent is extended or adjusted under 35 U.S.C. 154(b) by 743 days.

(21) Appl. No.: 10/838,787

(22) Filed: May 5, 2004

(65) Prior Publication Data

US 2005/0250582 A1 Nov. 10, 2005

(51) Int. Cl.
G06F 19/00 (2006.01)

(52) U.S. Cl. .................. 463/47; 273/148 R; 304/407.1; 463/30

(58) Field of Classification Search ............... None
See application file for complete search history.

(56) References Cited

U.S. PATENT DOCUMENTS

| 4,995,610 | A |   | 2/1991 | Paoletti |
| 5,054,771 | A |   | 10/1991 | Mansfield |
| 5,320,538 | A |   | 6/1994 | Baum |
| 5,421,590 | A |   | 6/1995 | Robbins |
| 5,474,452 | A | * | 12/1995 | Campagnuolo ............... 434/11 |
| 5,565,840 | A | * | 10/1996 | Thorner et al. .......... 340/407.1 |
| 5,788,500 | A | * | 8/1998 | Gerber ........................ 434/22 |
| 5,913,727 | A | * | 6/1999 | Ahdoot ........................ 463/39 |
| 6,302,796 | B1 | * | 10/2001 | Lebensfeld et al. ........... 463/51 |
| 6,422,941 | B1 | * | 7/2002 | Thorner et al. ............... 463/30 |

* cited by examiner

Primary Examiner—Ronald Laneau
Assistant Examiner—Tramar Harper
(74) Attorney, Agent, or Firm—Donald R. Schoonover

(57) ABSTRACT

A vest that is worn while playing a video game is in the shape of a bandoleer and has a multiplicity of tactile signal-producing elements thereon. The tactile-signal producing elements are located all around the player so the player will receive tactile signals from all directions and the signals can be received simultaneously so action in the video game will be accurately and realistically reproduced in the form of tactile signals.

2 Claims, 1 Drawing Sheet

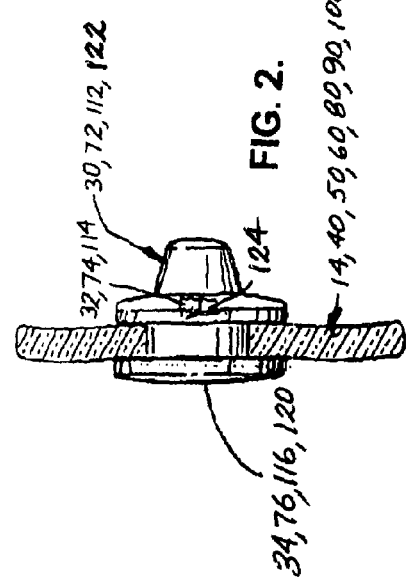
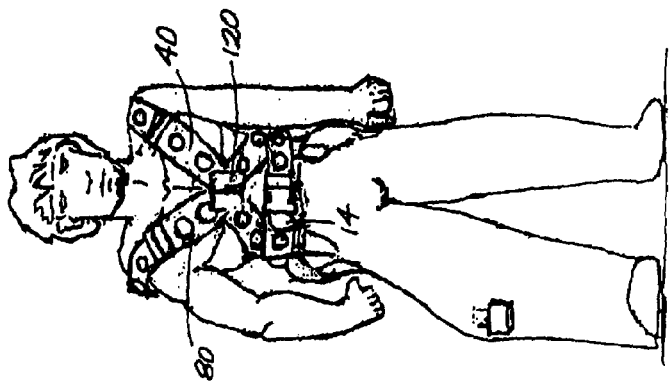
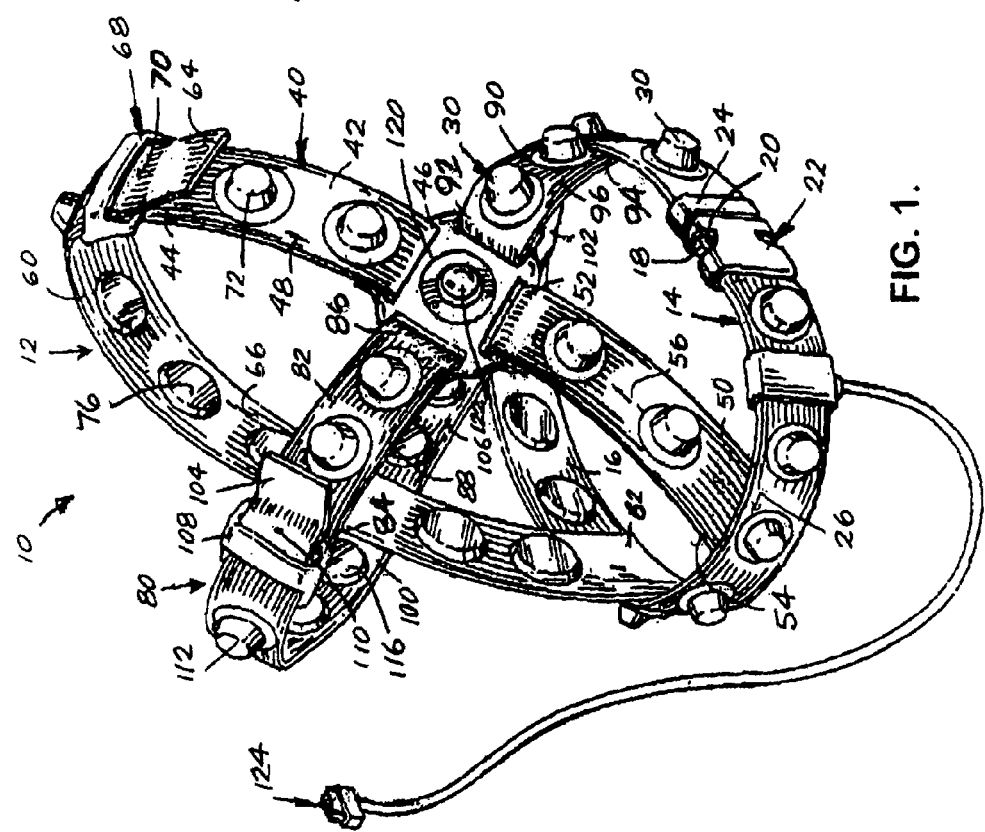

US 7,331,871 B2

TACTILE SIGNAL-PRODUCING VEST WORN WHILE PLAYING A VIDEO GAME

BACKGROUND OF THE INVENTION

1. Field of the Invention

The present invention relates to the general art of amusement devices, and to the particular field of amusement devices that include perceptible outputs or displays.

2. Discussion of the Related Art

Video games are typically played using a computer-based system. A player manipulates a keyboard, a mouse, or a joystick as a game scene is displayed on a video monitor, or the like. In addition to video output, many games also produce an audio output that enhances the visual experience.

With the advances made in microprocessors, video games are becoming more and more sophisticated and more and more prevalent, both in homes and in arcades.

While the sophistication of video games has improved to include both visual and audible sensations, there is yet another area that can be used to further enhance the enjoyment of video games. This area includes the sense of touch. That is, if a video game can include tactile sensations that correspond to the visual and/or audio scene associated with the game, the enjoyment of the game will be enhanced.

Therefore, there is a need for a system for producing tactile sensations corresponding to scenes associated with a video game.

While the art contains some forms of tactile systems, such as vibrating seats, vibrating joysticks and the like, the sophistication of video games has far surpassed such simple sensations.

For example, a particular video game may require a player to be located "in" the action. That is, the player may be receiving some sort of signal or stimulus from several directions at the same time. While some video games include the ability to have a surround sound effect, this audible effect is not sufficient to provide the multi-directional signal stimulus required for a fully simulative game. A simple vibration of a seat or of a joystick also does not simulate the sophisticated scenes and action that are available with many presently-available video games. Sensory inputs should be available from all directions, including front, rear, side, top, bottom and at all angles in order to accurately reflect the video game scene. Furthermore, many video games have a great deal of action occurring at the same time. The player is required to receive and process multiple simultaneous inputs. If a tactile input is only one dimensional and occurs from only one or two sources, the real action of the game is not being accurately simulated.

Therefore, there is a need for a system for producing complex tactile sensations which more nearly correspond to scenes associated with a video game than presently available systems.

PRINCIPAL OBJECTS OF THE INVENTION

It is a main object of the present invention to provide a system for producing tactile sensations corresponding to scenes associated with a video game.

It is another object of the present invention to provide a system for producing complex tactile sensations which more nearly correspond to scenes associated with a video game than presently available systems.

It is another object of the present invention to provide a system for producing complex tactile sensations which can be received by a user from all directions and at all angles to accurately reflect and correspond to scenes associated with a video game than presently available systems.

It is another object of the present invention to provide a system for producing complex tactile sensations which can be received by a user simultaneously from all directions and at all angles to accurately reflect and correspond to scenes associated with a video game than presently available systems.

SUMMARY OF THE INVENTION

These, and other, objects are achieved by a bandoleer-type vest having a plurality of buttons on each strap of the bandoleer, with each button including a system for producing tactile sensory signals. Each button is connected to the game controller and will generate a tactile signal that is sensed by a person wearing the vest in accordance with signals generated by the game controller. The vest fits around the wearer's shoulders, upper torso, waist, back and chest so there are tactile signal generators located all around the wearer's body. In this manner, the wearer will receive tactile signals on all parts of his or her body and the signals can be co-ordinated by the game controller to correspond to the action occurring in the game. Thus, for example, if a player is "attacked" from behind or from the side, or even from below on the side, the wearer can "feel" the attack and take appropriate action.

The bandoleer-type vest permits a video game to provide a total experience by including complex and multiple tactile signals that are co-ordinated with the visual and audible signals being received by the user. The "all around" nature of the tactile signals is similar to the "all around" audio experience of a surround sound system and the enhancement of the experience is also similar. The games become more real as the senses of the player are stimulated and the reality is enhanced when the senses are stimulated in ways that accurately and completely reflect the total and multi-directional action occurring in the game as opposed to simple and one-dimensional and one-directional stimuli which may not accurately reflect the total action occurring at any particular time during the video game which may be occurring from many directions. The vest of the present invention permits a player to receive stimuli from many directions at the same time, which further enhances the enjoyment of the game.

BRIEF DESCRIPTION OF THE DRAWING FIGURES

FIG. 1 is a perspective view of the bandoleer-type video game vest embodying the present invention.

FIG. 2 shows a detail of the vest shown in FIG. 1 and illustrates a tactile signal generating element on the vest.

FIG. 3 illustrates the vest embodying the present invention as it is worn by a user.

DETAILED DESCRIPTION OF THE PREFERRED EMBODIMENT

Other objects, features and advantages of the invention will become apparent from a tactile signal-producing vest 10 that is worn while a wearer is playing a video game.

Vest 10 comprises a bandoleer vest 12 which includes a first belt 14 which is adapted to encircle a wearer's waist when the vest is worn by the user as shown in FIG. 3. The first belt 14 has a body portion 16, a first end 18 on the body portion 16, and a second end 20 on the body portion 16. A first buckle portion 22 is located on the body 16 adjacent to the first end 18 and a second buckle portion 24 is located on the body 16 adjacent to the second end 20. A longitudinal axis 26 extends from the first end 18 to the second end 20.

A multiplicity of tactile signal-producing elements, such as tactile-producing element 30, are mounted on the body portion 16 of the first belt 14. The tactile signal-producing elements 30 are spaced apart from each other in the direction of the longitudinal axis 26 of the body 16 of the first belt 14. Each tactile signal-producing element 30 includes a signal-receiving circuit 32 and a vibration-producing element 34 connected to the signal-receiving circuit 32 to be activated when the signal-receiving circuit 32 connected thereto receives an activating signal and is activated thereby. As can be understood from FIG. 3, each vibration-producing element 34 of the first belt 14 is located to contact the wearer when the vest is worn.

A second belt 40 includes a first body portion 42 that, as shown in FIG. 3, is adapted to extend over one shoulder of the wearer adjacent to the wearer's neck when the vest is worn. The first body portion 42 includes a first end 44 and a second end 46 as well as a longitudinal axis 48 that extends between the first end 44 of first body portion 42 and the second end 46 of first body portion 42. The first body portion 42 of the second belt 40 is adapted to extend across the wearer's chest when the vest is worn. The second belt 40 further includes an intermediate body portion 50 which is adapted to extend across the wearer's abdomen when the vest is worn. The intermediate portion 50 includes a first end 52, a second end 54, and a longitudinal axis 56 which extends between first end 52 and second end 54. A second body portion 60 of belt 40 is adapted to extend across the wearer's shoulder blades and across the wearer's back when the vest is worn. End 54 of the intermediate body portion 50 of the second belt 40 is fixed to the first belt 14. The second body portion 60 of the second belt 40 includes a first end 62 fixed to the first belt 14 at a location spaced apart from end 54 of the intermediate body portion 50, a second end 64, and a longitudinal axis 66 that extends between the first end 62 of the second body portion 60 of the second belt 40 and the second end 64 of the second body portion 60 of the second belt 40. The second belt 40 further includes a first buckle portion 68 on the first end 44 of the first body portion 42 of the second belt 40 and a second buckle portion 70 on the second end 64 of the second body portion 60 of the second belt 40. The second belt 40 further includes a multiplicity of tactile signal-producing elements, such as element 72, mounted on the first body portion 42 of the second belt 40 and on the second body portion 60 of the second belt 40 and on the intermediate body portion 50 of the second belt 40. The tactile signal-producing elements 72 of the second belt 40 are spaced apart from each other in the directions of the longitudinal axes of the first body portion 42 of the second belt 40 and the second body portion 60 of the second belt 40 and of the intermediate body portion 50 of the second belt 40. Each tactile signal-producing element 72 of the second belt 40 includes a signal-receiving circuit 74, a vibration-producing element 76 connected to the signal-receiving circuit 74 of the signal-producing element 72 on the second belt 40 to be activated when the signal-receiving circuit 74 connected thereto receives an activating signal and is activated thereby. Each vibration-producing element 76 of the second belt 40 is located to contact the wearer when the vest is worn.

A third belt 80 includes a first body portion 82 that is adapted to extend over a second shoulder of the wearer adjacent to the wearer's neck and to extend across the wearer's chest when the vest is worn. First body portion 82 includes a first end 84, a second end 86, and a longitudinal axis 88 that extends between first end 84 and second end 86. Third belt 80 further includes an intermediate body portion 90 which is adapted to extend across the wearer's abdomen when the vest is worn. Intermediate body portion 90 includes a first end 92, a second end 94 which is fixed to the first belt 14 at a location spaced apart from end 20 of the first belt 14, and a longitudinal axis 96 which extends between first end 92 and second end 94. A second body portion 100 is adapted to extend across the wearer's shoulder blades and across the wearer's back when the vest is worn. The second body portion 100 of the third belt 80 has a first end 102 that is fixed to the first belt 14 at a location spaced apart from second end 94 of intermediate body portion 90, a second end 104, and a longitudinal axis 106 which extends between the first end 102 of the second body portion 100 of the third belt 80 and the second end 104 of the second body portion 100 of the third belt 80. The third belt 80 further includes a first buckle portion 108 on the first end 84 of the first body portion 82 of the third belt 80 and a second buckle portion 110 on the second end 104 of the second body portion 100 of the third belt 80. The third belt 80 further includes a multiplicity of tactile signal-producing elements, such as element 112, mounted on the first body portion 82 of the third belt 80 and on the second body portion 100 of the third belt 80 and on the intermediate body portion 90 of the third belt 80. The tactile signal-producing elements 112 of the third belt 80 are spaced apart from each other in the direction of the longitudinal axes of the first body portion 82 of the third belt 80 and the second body portion 100 of the third belt 80 and the intermediate body portion 90 of the third belt 80. Each tactile signal-producing element on the third belt 80 includes a signal-receiving circuit 114 and a vibration-producing element 116 connected to the signal-receiving circuit 114 of the signal-producing element 112 of the third belt 80 to be activated when the signal-receiving circuit 114 connected thereto receives an activating signal and is activated thereby. Each vibration-producing element 116 of the third belt 80 is located to contact the wearer when the vest is worn.

A belt-coupling element 120 is fixed to the second ends of the first body portions of the second and third belts, and is fixed to the first ends of the intermediate body portions of the second and third belts 40, 80. The belt-coupling element 120 is located adjacent to the chest of the wearer when the vest is worn and further includes a tactile signal-producing element 122 thereon which is located adjacent to the chest of the wearer when the vest is worn. Tactile signal-producing element 122 is identical to the above-described tactile signal-producing elements and thus will not be again described.

The first buckle portions of the second and third belts 40, 80 are located adjacent to the wearer's shoulders when the vest is being worn.

A circuit 124 is adapted to connect each signal-receiving circuit of the vest to a signal-producing circuit associated with a video game. Circuit 124 is known to those skilled in the art and thus will not be described.

It is understood that while certain forms of the present invention have been illustrated and described herein, it is not to be limited to the specific forms or arrangements of parts described and shown.

What is claimed and desired to be covered by Letters Patent is as follows:

1. A tactile signal-producing vest worn while playing a video game comprising:
   a) a bandoleer vest which includes
      (1) a first belt which encircles a wearer's waist when said vest is worn by the user, the first belt having a body portion, a first end on the body portion, a second end on the body portion, a first buckle portion on the body portion adjacent to the first end, a second buckle portion on the body portion adjacent to the second end, a longitudinal axis which extends from the first end to the second end, and a multiplicity of tactile signal-producing elements mounted on the body portion of the first belt, the tactile signal-producing elements being spaced apart from each other in the direction of the longitudinal axis of the body portion of the first belt, each tactile signal-producing element including a signal-receiving circuit, a vibration-producing element connected to the signal-receiving circuit to be activated when the signal-receiving circuit connected thereto receives an activating signal and is activated thereby, each vibration-producing element of the first belt being located to contact the wearer when the vest is worn, (2) a second belt which includes a first body portion that extends over one shoulder of the wearer adjacent to the wearer's neck and to extend across the wearer's chest when said vest is worn, the first body portion of the second belt including a first end, a second end, a longitudinal axis which extends between the first end of the first body portion of the second belt and the second end of the first body portion of the second belt, the second belt further including an intermediate body portion that extends across the wearer's abdomen, the intermediate body portion of the second belt further including a first end, a second end that is fixed to the first belt, and a longitudinal axis extending between the first end of the intermediate body portion of the second belt and the second end of the intermediate body portion of the second belt, the second belt further including a second body portion that extends across the wearer's shoulder blades and across the wearer's back when said vest is worn, the second body portion of the second belt further including a first end, a second end, and a longitudinal axis that extends between the first end of the second body portion of the second belt and the second end of the second body portion of the second belt, the first end of the second body portion of the second belt being fixed to the first belt at a location spaced apart from the second end of the intermediate body portion of the second belt, the second belt further including a first buckle portion on the first end of the first body portion of the second belt and a second buckle portion on the second end of the second body portion of the second belt, the second belt further including a multiplicity of tactile signal-producing elements mounted on the first body portion of the second belt and on the intermediate portion of the second belt and on the second body portion of the second belt, the tactile signal-producing elements of the second belt being spaced apart from each other in the direction of the longitudinal axes of the first body portion of the second belt, the intermediate portion of the second belt and the second body portion of the second belt, each tactile signal-producing element on the second belt including a signal-receiving circuit, and a vibration-producing element connected to the signal-receiving circuit of the signal producing element of the second belt to be activated when the signal-receiving circuit connected thereto receives an activating signal and is activated thereby, each vibration-producing element of the second belt being located to contact the wearer when the vest is worn, (3) a third belt which includes a first body portion that extends over a second shoulder of the wearer adjacent to the wearer's neck and to extend across the wearer's chest when said vest is worn, the first body portion of the third belt including a first end, a second end, a longitudinal axis which extends between the first end of the first body portion of the third belt and the second end of the first body portion of the third belt, the third belt further including an intermediate body portion that extends across the wearer's abdomen when said vest is worn, the intermediate body portion of the third belt further including a first end, a second end that is fixed to the first belt at a location spaced apart from the second end of the first belt, a longitudinal axis extending between the first end of the intermediate body portion of the third belt and the second end of the intermediate body portion of the third belt, the third belt further including a second body portion that extends across the wearer's shoulder blades and across the wearer's back when said vest is worn, the second body portion of the third belt further including a first end fixed to the first belt at a location spaced apart from the second end of the intermediate body portion of the second belt, a second end, and a longitudinal axis that extends between the first end of the second body portion of the third belt and the second end of the second body portion of the third belt, the third belt further including a first buckle portion on the first end of the first body portion of the third belt and a second buckle portion on the second end of the second body portion of the third belt, the third belt further including a multiplicity of tactile signal-producing elements mounted on the first body portion of the third belt and on the intermediate portion of the third belt and on the second body portion of the third belt, the tactile signal-producing elements of the third belt being spaced apart from each other in the direction of the longitudinal axes of the first body portion of the third belt and the second body portion of the third belt and the intermediate portion of the third belt, each tactile signal-producing element on the third belt including a signal-receiving circuit, a vibration-producing element connected to the signal-receiving circuit of the signal-producing element of the third belt to be activated when the signal-receiving circuit connected thereto receives an activating signal and is activated thereby, each vibration-producing element of the third belt being located to contact the wearer when said vest is worn, (4) a belt-coupling element which is fixed to the second ends of the first body portions of the second and third belts, and is fixed to the first ends of the intermediate body portions of the second and third belts, the belt-coupling element being located adjacent to the chest of the wearer when said vest is worn and further including a tactile signal-producing element thereon which is located adjacent to the chest of the wearer when said vest is worn, (5) the buckle portions of the second and third belts being located adjacent to the wearer's shoulders when said vest is being worn; and b) a circuit that connects each signal-receiving circuit of said vest to a signal-producing circuit associated with a video game; and c) wherein the vibration-producing elements are arranged to contact the front, rear, sides, top and bottom of a wearer's chest.

2. A tactile signal-producing vest worn while playing a video game comprising:
a) a bandoleer vest which includes
(1) a first belt encircling a wearer's waist when the vest is worn, the first belt having a body portion, a first end with a first buckle portion, a second end with a second buckle portion, a longitudinal axis extending between the first and second ends, and a multiplicity of tactile signal-producing elements mounted on the body portion; the tactile signal-producing elements being spaced apart along the longitudinal axis; each tactile signal-producing element including a signal-receiving circuit, a vibration-producing element connected to the signal-receiving circuit to be activated when the signal-receiving circuit connected thereto receives an activating signal and is activated thereby; each vibration-producing element being located to contact the wearer when the vest is worn,
(2) a second belt including:
(A) a first body portion extending over one of the wearer's shoulders and across the wearer's chest when the vest is worn, the first body portion having a first end with a first buckle portion, a second end, and a longitudinal axis extending between the first and second ends,
(B) an intermediate body portion extending across the wearer's abdomen when the vest is worn, the intermediate body portion having a first end, a second end fixed to the first belt at a location spaced apart from the first end of the first belt, and a longitudinal axis extending between the first and second ends,
(C) a second body portion extending across the wearer's shoulder blades and back when the vest is worn, the second body portion having a first end fixed to the first belt at a location spaced apart from the second end of the intermediate body portion, a second end having a second buckle portion, and a longitudinal axis extending between the first and second ends,
(D) a multiplicity of tactile signal-producing elements mounted on the first, intermediate, and second body portions; the tactile signal-producing elements being spaced apart along the longitudinal axes of the first, intermediate, and second body portions; each tactile signal-producing element including a signal-receiving circuit and a vibration-producing element connected to the signal-receiving circuit to be activated when the signal-receiving circuit connected thereto receives an activating signal and is activated thereby; each vibration-producing element being located to contact the wearer when the vest is worn,
(3) a third belt including:
(A) a first body portion extending over a second shoulder of the wearer and across the wearer's chest when the vest is worn, the first body portion including a first end with a first buckle portion, a second end, and a longitudinal axis extending between the first and second ends,
(B) an intermediate body portion extending across the wearer's abdomen when the vest is worn, the intermediate body portion having a first end, a second end fixed to the first belt at a location spaced apart from the second end of the first belt, a second end, and a longitudinal axis extending between the first and second ends,
(C) a second body portion extending across the wearer's shoulder blades and back when the vest is worn; the second body portion having a first end fixed to the first belt at a location spaced apart from the second end of the intermediate body portion, a second end having a second buckle portion, and a longitudinal axis extending between the first and second ends,
(D) a multiplicity of tactile signal-producing elements mounted on the first, intermediate, and second body portions; the tactile signal-producing elements being spaced apart along the longitudinal axes of the first, intermediate, and second body portions; each tactile signal-producing element including a signal-receiving circuit and a vibration-producing element connected to the signal-receiving circuit to be activated when the signal-receiving circuit connected thereto receives an activating signal and is activated thereby; each vibration-producing element being located to contact the wearer when the vest is worn,
(4) a belt-coupling element fixed to the second ends of the first body portions of the second and third belts, and to the first ends of the intermediate body portions of the second and third belts; the belt-coupling element being located adjacent to the chest of the wearer when the vest is worn and including a tactile signal-producing element thereon which is located adjacent to the chest of the wearer when the vest is worn,
(5) the buckle portions of the second and third belts being located adjacent to the wearer's shoulders when the vest is worn; and
b) a circuit that connects each signal-receiving circuit of the vest to a signal-producing circuit associated with a video game; and
c) wherein the vibration-producing elements are arranged to contact the front, rear, sides, top and bottom of a wearer's chest.

* * * * *